US011972028B2

(12) United States Patent
Ashokkumar et al.

(10) Patent No.: US 11,972,028 B2
(45) Date of Patent: Apr. 30, 2024

(54) METHOD AND SYSTEM FOR MANAGING DATA PROTECTION FEATURE COMPATIBILITY

(71) Applicant: EMC IP Holding Company LLC, Hopkinton, MA (US)

(72) Inventors: Pravin Kumar Ashokkumar, Bangalore (IN); Preeti Varma, Bangalore (IN); Jayashree B. Radha, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 527 days.

(21) Appl. No.: 17/385,375

(22) Filed: Jul. 26, 2021

(65) Prior Publication Data

US 2022/0398346 A1   Dec. 15, 2022

(30) Foreign Application Priority Data

Jun. 11, 2021   (IN) .............................. 202141026041

(51) Int. Cl.
*G06F 21/60* (2013.01)
*G06F 16/23* (2019.01)
*G06F 21/57* (2013.01)
*G06F 21/62* (2013.01)
*G06F 21/64* (2013.01)

(52) U.S. Cl.
CPC ...... *G06F 21/6281* (2013.01); *G06F 16/2365* (2019.01); *G06F 21/57* (2013.01); *G06F 21/6227* (2013.01); *G06F 21/64* (2013.01)

(58) Field of Classification Search
CPC .. G06F 21/6281; G06F 16/2365; G06F 21/57; G06F 21/6227; G06F 21/64; G06F 21/604

See application file for complete search history.

(56) References Cited

U.S. PATENT DOCUMENTS

| 9,152,817 | B1* | 10/2015 | Shah | G06F 21/6227 |
| 2007/0180490 | A1* | 8/2007 | Renzi | G06F 21/604 726/1 |
| 2014/0095868 | A1* | 4/2014 | Korthny | G06F 21/64 713/165 |
| 2015/0227602 | A1* | 8/2015 | Ramu | G06F 11/1456 707/634 |
| 2015/0358309 | A1* | 12/2015 | Edwards, Jr. | G06F 11/1402 726/6 |

(Continued)

*Primary Examiner* — Joseph P Hirl
*Assistant Examiner* — Aayush Aryal
(74) *Attorney, Agent, or Firm* — Chamberlain, Hrdlicka, White, Williams, & Aughtry; Aly Z. Dossa

(57) ABSTRACT

Techniques described herein relate to a method for managing data protection feature compatibility. The method may include identifying a host data protection feature update event associated with a host; in response to identifying the host data protection feature update event, obtaining host data protection feature information from the host; updating a host data protection feature information repository using the host data protection feature information; updating data protection feature compatibility information using the host data protection feature information and data protection manager data protection feature information; and sending data protection feature compatibility information associated with the host to the host.

20 Claims, 8 Drawing Sheets

(56) References Cited

U.S. PATENT DOCUMENTS

| | | | |
|---|---|---|---|
| 2019/0042230 A1* | 2/2019 | Dewan | G06F 21/57 |
| 2019/0236295 A1* | 8/2019 | Fair | G06F 21/6218 |
| 2020/0348922 A1* | 11/2020 | Krasner | G06F 8/654 |
| 2020/0394110 A1* | 12/2020 | Ramohalli Gopala Rao | G06F 16/285 |

* cited by examiner

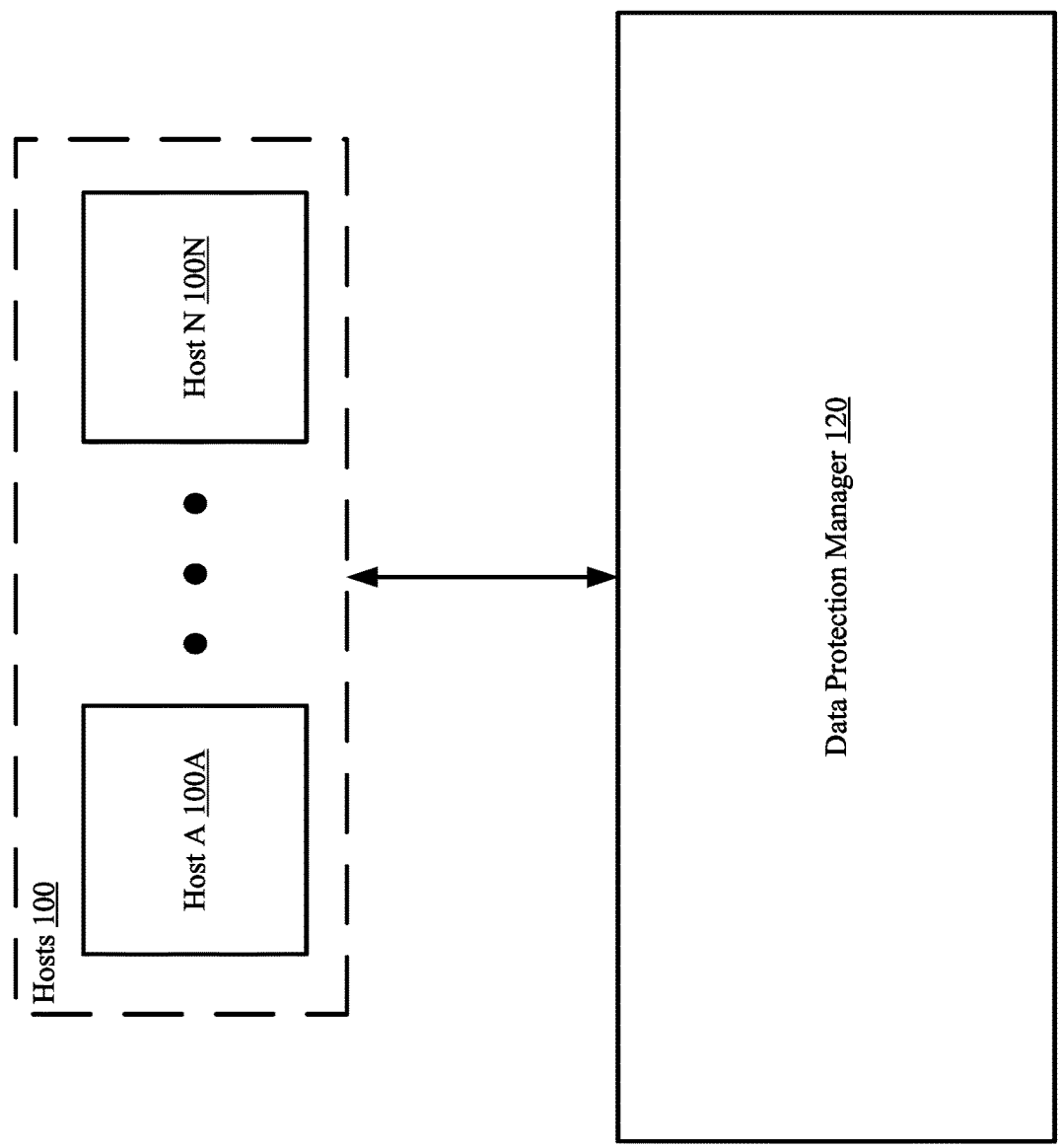

METHOD AND SYSTEM FOR MANAGING DATA PROTECTION FEATURE COMPATIBILITY

BACKGROUND

Computing devices may provide services. To provide the services, the computing devices may include hardware components and software components. Data may be generated by the computing devices during the performance of the services. The data may be important to users. To protect the data, backups of the data may be generated and stored in storage devices. The components may be updated to improve the performance of services.

SUMMARY

In general, in one aspect, the invention relates to a method for managing data protection feature compatibility. The method includes identifying a host data protection feature update event associated with a host; in response to identifying the host data protection feature update event, obtaining host data protection feature information from the host; updating a host data protection feature information repository using the host data protection feature information; updating data protection feature compatibility information using the host data protection feature information and data protection manager data protection feature information; and sending data protection feature compatibility information associated with the host to the host.

In general, in one aspect, the invention relates to a system that includes persistent storage for storing data protection feature compatibility information and a data protection manager. The data protection manager includes a processor and memory and is configured to identify a host data protection feature update event associated with a host; in response to identifying the host data protection feature update event: obtain host data protection feature information from the host; update a host data protection feature information repository using the host data protection feature information; update the data protection feature compatibility information using the host data protection feature information and data protection manager data protection feature information; and send data protection feature compatibility information associated with the host to the host.

In general, in one aspect, the invention relates to a non-transitory computer readable medium which includes computer readable program code, which when executed by a computer processor enables the computer processor to perform a method for managing data protection feature compatibility. The method includes identifying a host data protection feature update event associated with a host; in response to identifying the host data protection feature update event, obtaining host data protection feature information from the host; updating a host data protection feature information repository using the host data protection feature information; updating data protection feature compatibility information using the host data protection feature information and data protection manager data protection feature information; and sending data protection feature compatibility information associated with the host to the host.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
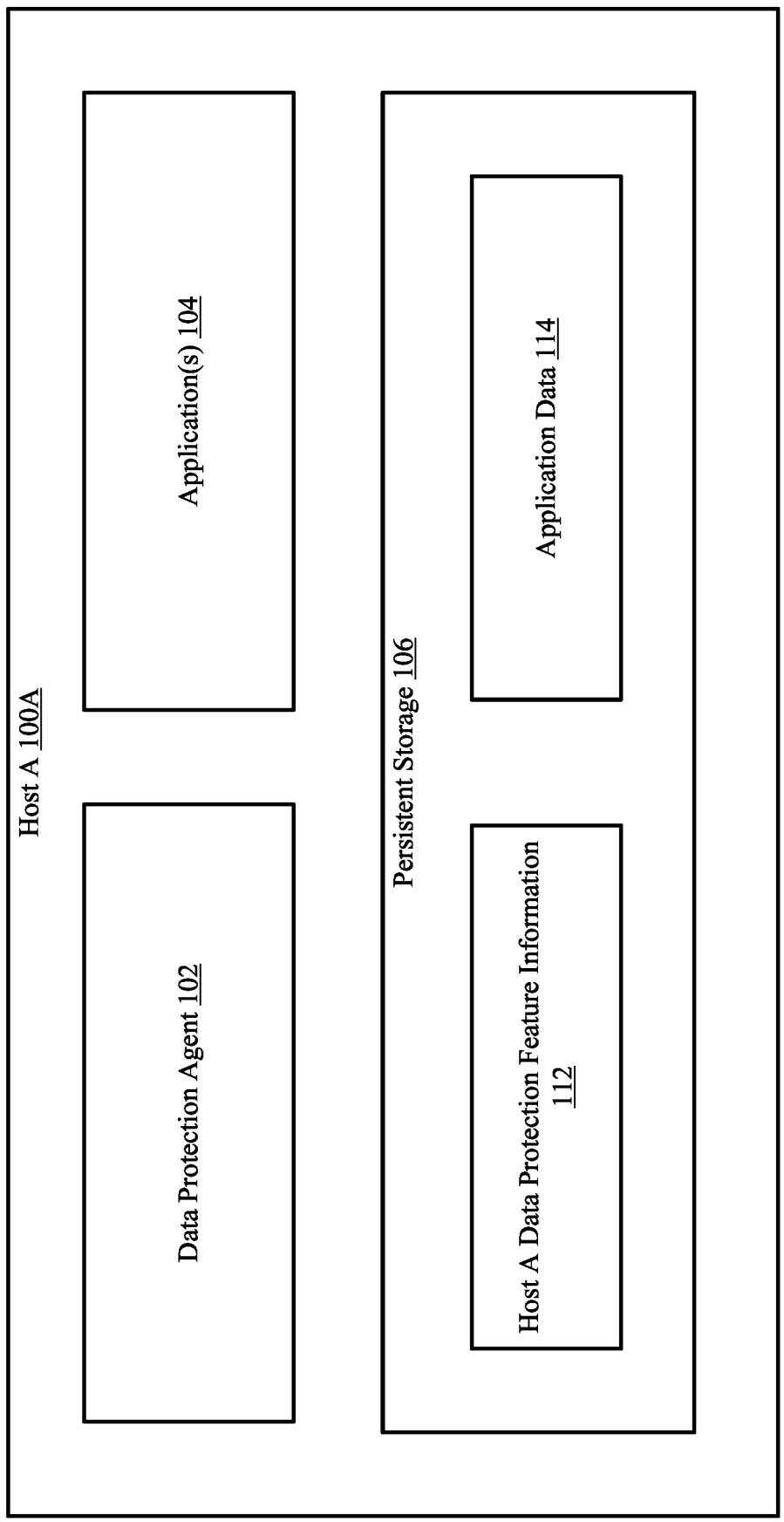
FIG. 1B shows a diagram of a host in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and a method for managing data protection feature compatibility between hosts and a data protection manager.

More specifically, embodiments of the invention relate to an upgrade manager of the data protection manager that may automatically update data protection feature compatibility information that may specify host incompatibilities with the data protection manager when a host registers, when a data protection agent associated with a host is upgraded, and when the data protection manager is upgraded. The upgrade manager may use the data protection feature compatibility information to identify host incompatibilities with the data protection manager and to notify users of the host about the identified host incompatibilities. Accordingly, users may upgrade the data protection agents of the hosts to resolve host incompatibilities in an efficient manner.

FIG. 1A shows a diagram of a system in accordance with one or more embodiments of the invention. The system may include hosts (100) and a data protection manager (120). The system may include additional, fewer, and/or different components without departing from the invention. Each component may be operatively connected to any of the other components via any combination of wired and/or wireless connections. Each of the aforementioned components is discussed below.

In one or more embodiments of the invention, the hosts (100) provide computer implemented services to users of the system (e.g., clients, not shown). The computer implemented services may include database services, instant messaging services, electronic communication services, and any other type of computer implemented services without departing from the invention. The hosts (100) may obtain data protection services from the data protection manager (120). The data protection services may include managing the generation of backups of data generated by the hosts (100) during the performance of the aforementioned computer implemented services. The data protection services may further include managing data protection feature compatibility between the data protection manager and the hosts (100). The hosts (100) may obtain and/or provide other and/or additional services without departing from the invention. For additional information regarding the host (100), refer to FIG. 1B.

Figure 4:
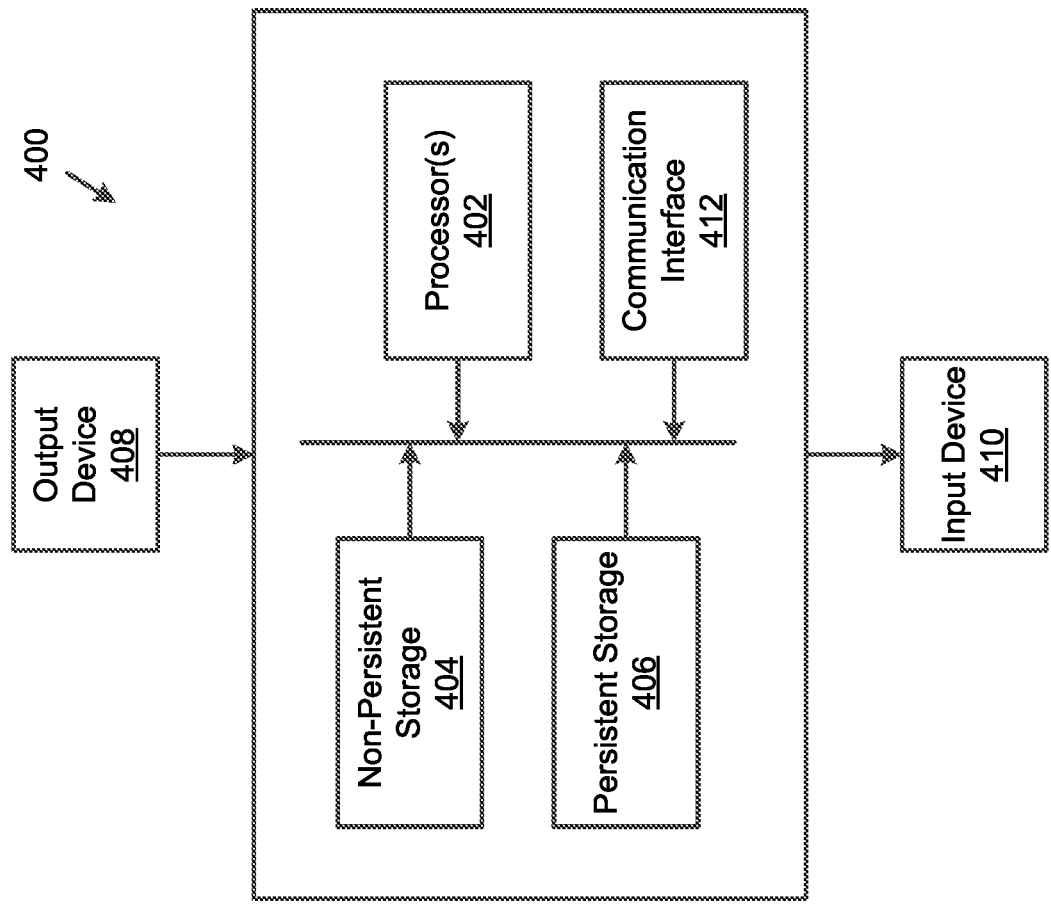
FIG. 4 shows a diagram of a computing device in accordance with one or more embodiments of the invention.

In one or more embodiments of the invention, a host (e.g., host A (100A) and host N (100N)) of the hosts (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a host (e.g., 100A) of the hosts (100) described throughout this application. For additional information regarding the hosts (100), refer to FIG. 1B.

In one or more embodiments of the invention, the hosts (100) are implemented as logical devices. A logical device may utilize the computing resources of any number of computing devices and thereby provide the functionality of a host (e.g., 100A) of the hosts (100) described throughout this application. For additional information regarding the hosts (100), refer to FIG. 1B.

In one or more embodiments of the invention, the data protection manager (120) includes the functionality to provide data protection services to the hosts (100) as discussed above. The data protection services may include managing the generation of backups of data generated by the hosts (100) during the performance of the aforementioned computer implemented services. The data protection services may further include managing data protection feature compatibility between the data protection manager and the hosts (100). For additional information regarding the management of data protection feature compatibility, refer to FIGS. 2A-2B. The data protection services may include any number of data protection features. The data protection feature may include, for example, processing on-demand backups, initiating the performance of and/or performing deduplication and undeduplication, initiating the performance of and/or performing compression and decompression, performing point in time restorations of hosts (100), and any other and/or additional data protection feature associated with the data protection manager (120). The data protection services may include other and/or additional services without departing from the invention. The data protection manager (120) may be updated to newer versions. Each version of the data protection manager (120) may be associated with any number of data protection features associated with the data protection manager. Newer versions of the data protection manager (120) may be associated with additional and/or different types of data protection features compared to previous versions of the data protection manager. The data protection manager (120) may provide and/or obtain other and/or additional services without departing from the invention. For additional information regarding the data protection manager, refer to FIG. 1C.

In one or more embodiments of the invention, data protection manager (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (120) described throughout this application. For additional information regarding the data protection manager (120), refer to FIG. 1C.

In one or more embodiments of the invention, the data protection manager (120) is implemented as a logical device. A logical device may utilize the computing resources of any number of computing devices and thereby provide the functionality of the data protection manager (120) described throughout this application. For additional information regarding the data protection manager (120), refer to FIG. 1C.

FIG. 1B shows a diagram of a host in accordance with one or more embodiments of the invention. Host A (100A) may be an embodiment of the hosts (100, FIG. 1A) discussed above. As discussed above, host A (100A) may provide computer implemented services to users and obtain data protection services from the data protection manager (120). To provide and obtain the aforementioned computer implemented services and the data protection services, the host A (100A) may include a data protection agent (102), application(s) (104), and persistent storage (106). Host A (100A) may include other and/or additional components without departing from the invention. Each of the aforementioned components is discussed below.

In one or more embodiments of the invention, the data protection agent (102) includes the functionality to perform local data protection services based on requests obtained from the data protection manager (120, FIG. 1A). The local data protection services may include, for example, generating backups of application data associated with the application(s) (104). The local data protection services may include performing data protection features. The data protection features may include, for example, generating on-demand backups, performing deduplication and undeduplication, performing compression and decompression, performing point-in-time restorations of applications and/or any other and/or additional data protection features without departing from the invention. The data protection agent (102) may be updated to newer versions. Each version of the data protection agent (102) may be associated with any number of data protection features. Newer versions of the data protection agent (102) may be associated with additional and/or different types of data protection features compared to previous versions of the data protection agent (102). The data protection agent (102) may include other and/or additional functionalities without departing from the invention.

In one or more embodiments of the invention, the data protection agent (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data protection agent (102) described throughout this application.

In one or more embodiments of the invention, the data protection agent (102) is implemented as computer instructions, e.g., computer code, stored on a persistent storage that when executed by a processor of host A (100A) causes host A (100A) to provide the functionality of the data protection agent (102) described throughout this application.

In one or more embodiments of the invention, host A (100A) hosts one or more applications (104). In one or more embodiments of the invention, the application(s) (104) perform computer implemented services for users. Performing the computer implemented services may include performing operations on application data that is stored in host A (100A). The application(s) (104) and/or users of host A (100A) may include functionality for performing the aforementioned operations on the application data in the host A (100A). The application(s) (104) may be, for example, instances of databases, email servers, and/or other applications. Host A (100A) may host any other type of application without departing from the invention.

In one or more of embodiments of the invention, the application(s) (104) is implemented as computer instructions, e.g., computer code, stored on a persistent storage (e.g., 106) that when executed by a processor(s) of host A (100A) cause host A (100A) to provide the functionality of the application(s) (104) described throughout this application.

In one or more embodiments of the invention, the persistent storage (106) stores data. The persistent storage (106) may include host A data protection feature information (112) and application data (114). The persistent storage (106) may store other and/or additional data without departing from the invention. Each of the aforementioned types of data stored in the persistent storage (106) is discussed below.

The host A data protection feature information (112) may include one or more data structures that may be used specify the data protection features associated with the data protection agent (102) of host A (100A). The host A data protection feature information (112) may include a version identifier associated with a version of the data protection agent (102). The host A data protection feature information (112) may further include a list of data protection feature identifiers and data protection feature descriptions that are associated with the data protection features that may be performed by the data protection agent (102). The data protection feature identifiers may be, for example, a unique combination of bits associated with a particular data protection feature that may be used to specify the particular data protection feature. The data protection feature descriptions may specify the functionality of a particular data protection feature. The host A data protection feature information (112) may be updated by the data protection agent (102) when the data protection agent is updated. The data protection agent (102) may send the host A data protection feature information (112) to the data protection manager (120, FIG. 1A) when host A (100A) registers with the data protection manager (120, FIG. 1A) and when the data protection agent (102) is upgraded. The host A data protection feature information (112) is used to generate a data protection feature compatibility information entry associated with host A (100A) (i.e., to determine compatibility between host A (100A) and the data protection manager (120, FIG. 1A). The host A data protection feature information (112) may include other and/or additional information without departing from the invention.

The application data (114) may be one or more data structures that include the data generated and/or used by the application(s) (104) when performing computer implemented services. The application data (114) may include, for example, database data, email data, instant messaging data, etc. The application data (114) may include other and/or additional types of data without departing from the invention. The data protection agent (102) may generate backups of the application data (114) and/or further use the application data (114) to provide local data protection services.

The persistent storage (106) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (106) may utilize portions of any combination of hard disk drives, solid state disk drives, tape drives, and/or any other physical storage medium of any number of computing devices.

Figure 1C:
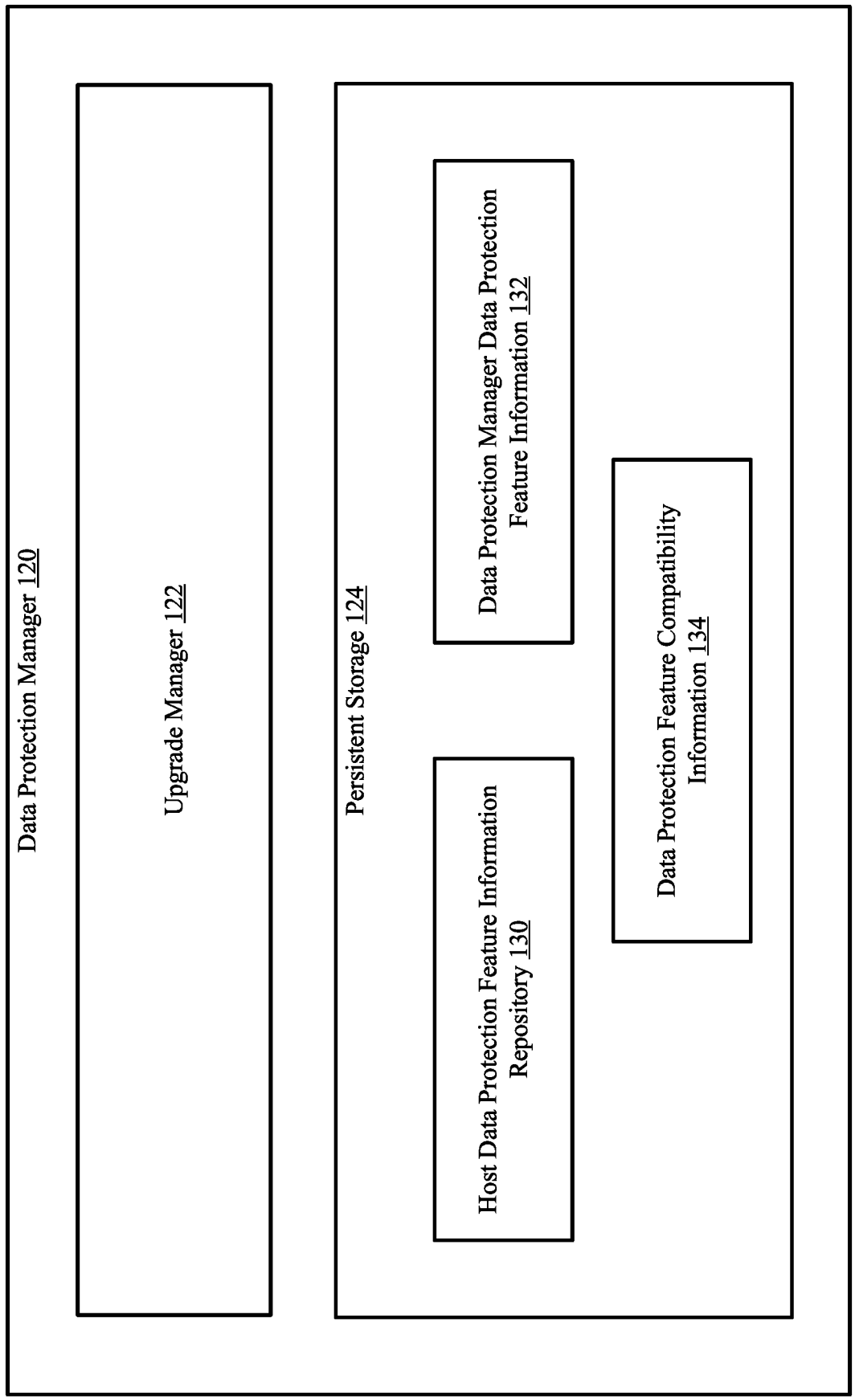
FIG. 1C shows a diagram of a data protection manager in accordance with one or more embodiments of the invention.

FIG. 1C shows a diagram of a data protection manager in accordance with one or more embodiments of the invention. Data protection manager (120) may be an embodiment of the data protection manager (120, FIG. 1A) discussed above. As discussed above, the data protection manager (120) may provide data protection services for the hosts (100, FIG. 1A). To provide the aforementioned data protection services, the data protection manager (120) may include an upgrade manager (122) and persistent storage (124). The data protection manager (120) may include other and/or additional components without departing from the invention. Each of the aforementioned components is discussed below.

In one or more embodiments of the invention, the upgrade manager (122) includes the functionality to manage data protection feature compatibility between the data protection manager (120) and the hosts (100). The upgrade manager (122) may perform the methods described in FIGS. 2A-2B. The upgrade manager (122) may include other and/or additional functionalities without departing from the invention.

In one or more embodiments of the invention, the upgrade manager (122) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the upgrade manager (122) described throughout this application.

In one or more embodiments of the invention, the upgrade manager (122) is implemented as computer instructions, e.g., computer code, stored on a persistent storage that when executed by a processor of the data protection manager (120) causes the data protection manager (120) to provide the functionality of the upgrade manager (122) described throughout this application.

In one or more embodiments of the invention, the persistent storage (124) stores data. The persistent storage (124) may include a host data protection feature information repository (130), data protection manager data protection feature information (132), and data protection feature compatibility information (134). The persistent storage (124) may store other and/or additional data without departing from the invention. Each of the aforementioned types of data stored in the persistent storage (124) is discussed below.

The host data protection feature information repository (130) may include one or more data structures that include host entries associated with each registered host of the hosts (100, FIG. 1A). Each host entry may include host data protection feature information associated with the host. The host data protection feature information may be an embodiment of host A data protection feature information discussed above (see e.g., 112, FIG. 1B). The host data protection feature information repository (130) may include other and/or additional information without departing from the invention.

The data protection manager data protection feature information (132) may be one or more data structures that include information associated with the data protection features of the data protection manager (120). The data protection manager data protection feature information (132) may include a data protection manager version identifier associated with a version of the data protection manager (120). The data protection manager data protection feature information (132) may further include a list of data protection feature identifiers and data protection feature descriptions that are associated with the data protection features that may be performed by the data protection manager (120). The data protection feature identifiers may be, for example, a unique combination of bits associated with a particular data protection feature that may be used to specify the particular data protection feature. The data protection feature descriptions may specify the functionality of a particular data protection feature. The data protection manager data protection feature information (132) may be updated by the upgrade manager (122) when the data protection manager (120) is upgraded. The data protection manager data protection feature information (132) may be used to generate data protection feature compatibility information (134). The data protection manager data protection feature information (132) may include other and/or additional information without departing from the invention.

The data protection feature compatibility information (134) may include one or more data structures that include entries associated with each host of the hosts (100, FIG. 1A). Each entry may include a list of data protection feature identifiers of the data protection manager (120) that are compatible with the data protection features of the data protection agent of the host. Each entry may also include a list of data protection feature identifiers of the data protection manager (120) that are incompatible with the data protection features of the data protection agent of the host. The entry may also specify whether the host is fully compatible, partially compatible, or incompatible with the data protection manager (120). The data protection feature compatibility information (134) may be used by the upgrade manager to determine and identify host incompatibilities. The data protection feature compatibility information (134) may include other and/or additional information without departing from the invention.

The persistent storage (124) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (124) may utilize portions of any combination of hard disk drives, solid state disk drives, tape drives, and/or any other physical storage medium of any number of computing devices.

Figure 2A:
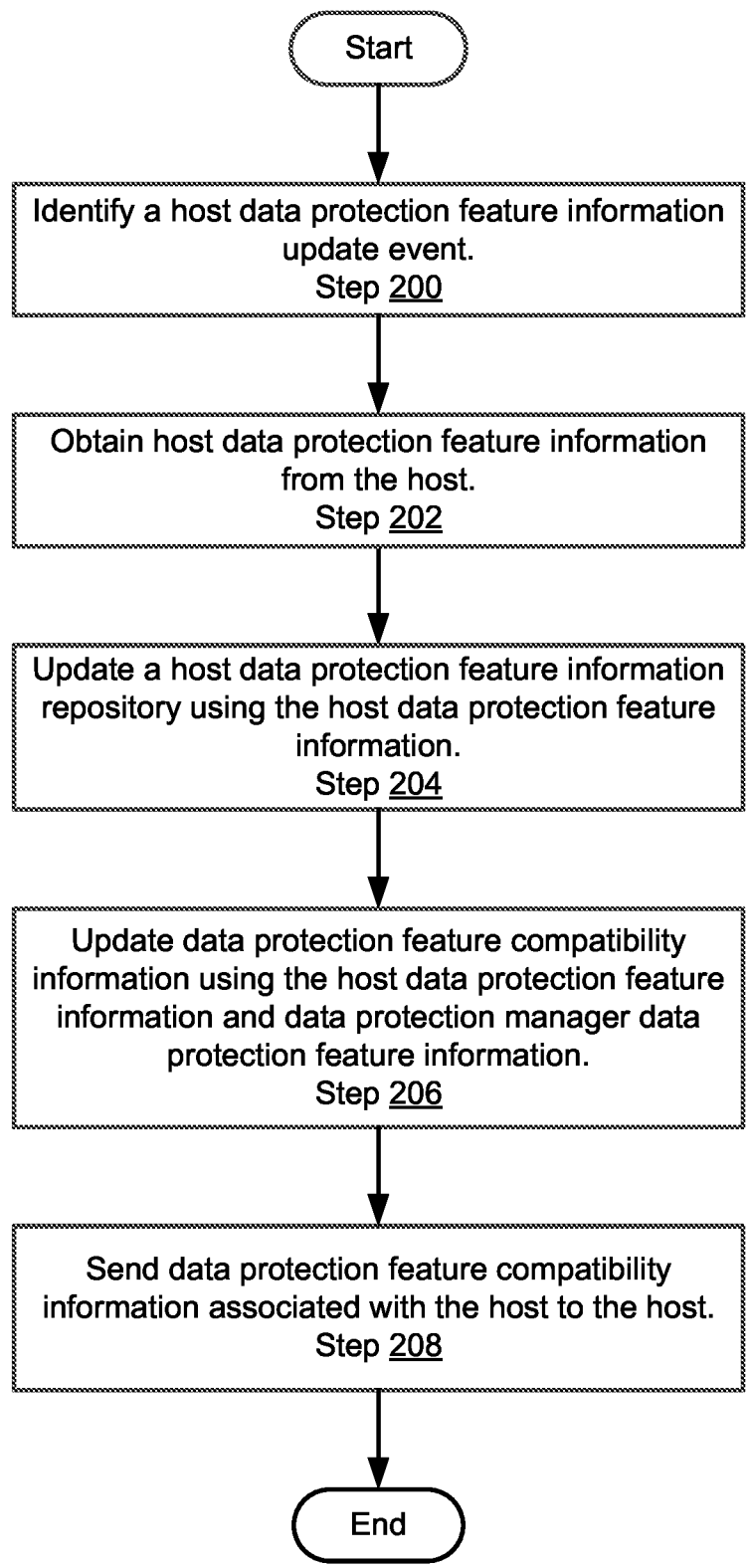
FIG. 2A shows a flowchart of a method for managing updates to hosts in accordance with one or more embodiments of the invention.

FIG. 2A shows a flowchart of a method for managing updates to hosts in accordance with one or more embodiments of the invention. The method may be performed by, for example, an upgrade manager (122, FIG. 1A) of a data manager (120, FIG. 1A). Other components of the system illustrated in FIG. 1A may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, a host data protection feature information update event is identified.

In one or more embodiments of the invention, a data protection agent of a host associated with the data protection manager is upgraded. Consequently, the data protection agent may send a message to the upgrade manager of the data protection manager. The message may include a notification that the data protection agent was updated. The notification may include a data protection agent identifier and/or a host identifier associated with the upgraded data protection agent. The message may include other and/or additional information without departing from the invention. The message may be, for example, an application programming interface (API) call. The upgrade manager may identify the receipt of the aforementioned message as the host data protection feature information update event. The host data protection feature information update event may be identified via other and/or additional methods without departing from the invention.

In one or more embodiments of the invention, a host registers with the data protection manager. Accordingly, the data protection agent of the host may send a message to the upgrade manager of the data protection manager. The message may include a request to register with the data protection manager. The message may further include communication information associated with the data protection agent. The communication information may include, for example, a data protection agent identifier, an associated host identifier, a network address, a port number, and/or other and/or additional information that may be used to communicate with the data protection agent and/or the host without departing from the invention. The message may include other and/or additional information without departing from the invention. The message may be, for example, an API call. The upgrade manager may identify the receipt of the aforementioned message as the host data protection feature information update event. The host data protection feature information update event may be identified via other and/or additional methods without departing from the invention.

In step 202, host data protection feature information is obtained from a host associated with the host data protection feature information update event.

In one or more embodiments of the invention, the upgrade manager sends a message to the data protection agent of the host using communication information associated with the data protection agent and the host. The message may include a request for host data protection feature information associated with the host. The message may be, for example, an API call. In response to obtaining the message, the data protection agent of the host may generate and/or obtain the host data protection feature information associated with the host and provide the host data protection feature information to the upgrade manager. The host data protection feature information may be obtained from the host associated with the host data protection feature information update event via other and/or additional methods without departing from the invention.

In step 204, the host data protection feature information repository is updated using the host data protection feature information.

In one or more embodiments of the invention, the upgrade manager updates the host data protection feature information repository by updating an entry of the host data protection feature information associated with the host. The upgrade manager may check existing entries included in the host data protection feature information repository and compare the data protection agent identifiers and/or host identifiers included in each entry with the data protection agent identifier and/or host identifier obtained in the host data protection update event. The upgrade manager may identify the entry of the host data protection feature information repository that includes the data protection agent identifier and/or the host identifier that matches the data protection identifier and/or the host identifier of the host data protection feature update event. The identified entry may correspond with the host associated with the host data protection feature update event. The entry may include the host data protection feature information associated with the host. The upgrade manager may replace previously obtained host data protection feature information with the host data protection feature information obtained above in step 202. The entry in the host data protection feature information repository may include other and/or additional information without departing from the invention. The host data protection feature information repository may be updated using the host data protection feature information via other and/or additional methods without departing from the invention.

In one or more embodiments of the invention, the upgrade manager updates the host data protection feature information repository by generating an entry associated with the host. If no entry included in the host data protection feature information repository includes the data protection agent identifier and/or the host identifier associated with the host data protection feature update event (i.e., the host data protection feature update event is associated with a host registration), then the upgrade manager may generate an entry associated with the host. The entry may include the host data protection feature information associated with the host. The entry may also include the communication information associated with the host included in the registration request. The entry in the host data protection feature information repository may include other and/or additional information without departing from the invention. The host data protection feature information repository may be updated using the host data protection feature information via other and/or additional methods without departing from the invention.

In step 206, the data protection feature compatibility information is updated using the host data protection feature information and data protection manager data protection feature information.

In one or more embodiments of the invention, the upgrade manager updates the data protection feature compatibility information by generating an entry of the data protection feature compatibility information associated with the host. The upgrade manager may check existing entries included in the data protection feature compatibility information and compare the data protection agent identifiers and/or host identifiers included in each entry with the data protection agent identifier and/or host identifier obtained in the host data protection update event. The upgrade manager may identify the entry of the data protection feature compatibility information that includes the data protection agent identifier and/or the host identifier that matches the data protection identifier and/or the host identifier of the host data protection feature update event. The identified entry may correspond with the host associated with the host data protection feature update event. The entry may include the data protection feature compatibility information associated with the host.

The upgrade manager may replace previously generated data protection feature compatibility information with data protection feature compatibility information using the host data protection feature information associated with the host obtained above in step 202 and data protection manager data protection feature information. The upgrade manager may compare the host data protection feature information with the data protection manager data protection feature information to identify all data protection features that are compatible and/or all data protection features that are incompatible between the data protection manager and the host. The upgrade manager may generate a list of compatible features and/or generate a list of incompatible features. The entry may specify whether (i) the host is fully compatible (i.e., host data protection features match all of data protection manager data protection features) with the data protection manager, (ii) partially compatible (i.e., host data protection features include some of the data protection manager data protection features) with the data protection manager, or (iii) incompatible (i.e., data protection manager data protection features are not included in the host data protection features) with the data protection manager. The entry in the data protection feature compatibility information may include other and/or additional information without departing from the invention. The data protection feature compatibility information may be updated using the host data protection feature information and the data protection manager data protection feature information via other and/or additional methods without departing from the invention.

In one or more embodiments of the invention, the upgrade manager updates the data protection feature compatibility information by generating an entry associated with the host. If no entry included in the data protection feature compatibility information includes the data protection agent identifier and/or the host identifier associated with the host data protection feature update event (i.e., the host data protection feature update event is associated with a host registration), then the upgrade manager may generate an entry associated with the host. The upgrade manager may compare the host data protection feature information with the data protection manager data protection feature information to identify all data protection features that are compatible and/or all data protection features that are incompatible between the data protection manager and the host. The upgrade manager may generate a list of compatible features and/or generate a list of incompatible features. The entry may specify whether (i) the host is fully compatible (i.e., host data protection features match all of data protection manager data protection features) with the data protection manager, (ii) partially compatible (i.e., host data protection features include some of the data protection manager data protection features) with the data protection manager, or (iii) incompatible (i.e., data protection manager data protection features not included in the host data protection features) with the data protection manager. The entry in the data protection feature compatibility information may include other and/or additional information without departing from the invention. The data protection feature compatibility information may be updated using the host data protection feature information and the data protection manager data protection feature information via other and/or additional methods without departing from the invention.

In step 208, the data protection feature compatibility information associated with the host is sent to the host.

In one or more embodiments of the invention, the upgrade manager sends the data protection feature compatibility information entry associated with the host to the host. Accordingly, the data protection feature compatibility information may be available to a user of the host. The data protection feature compatibility information may be displayed, by the data protection agent, to a user using a graphical user interface (GUI) and/or any other type of user interface without departing from the invention. The user may determine, based on the data protection feature compatibility information, whether to proceed with the current version of the data protection agent executing on the host or to upgrade the data protection agent executing on the host. The data protection feature compatibility information associated with the host may be sent to the host via other and/or additional methods without departing from the invention.

In one or more embodiments of the invention, the method ends following step 208.

Figure 2B:
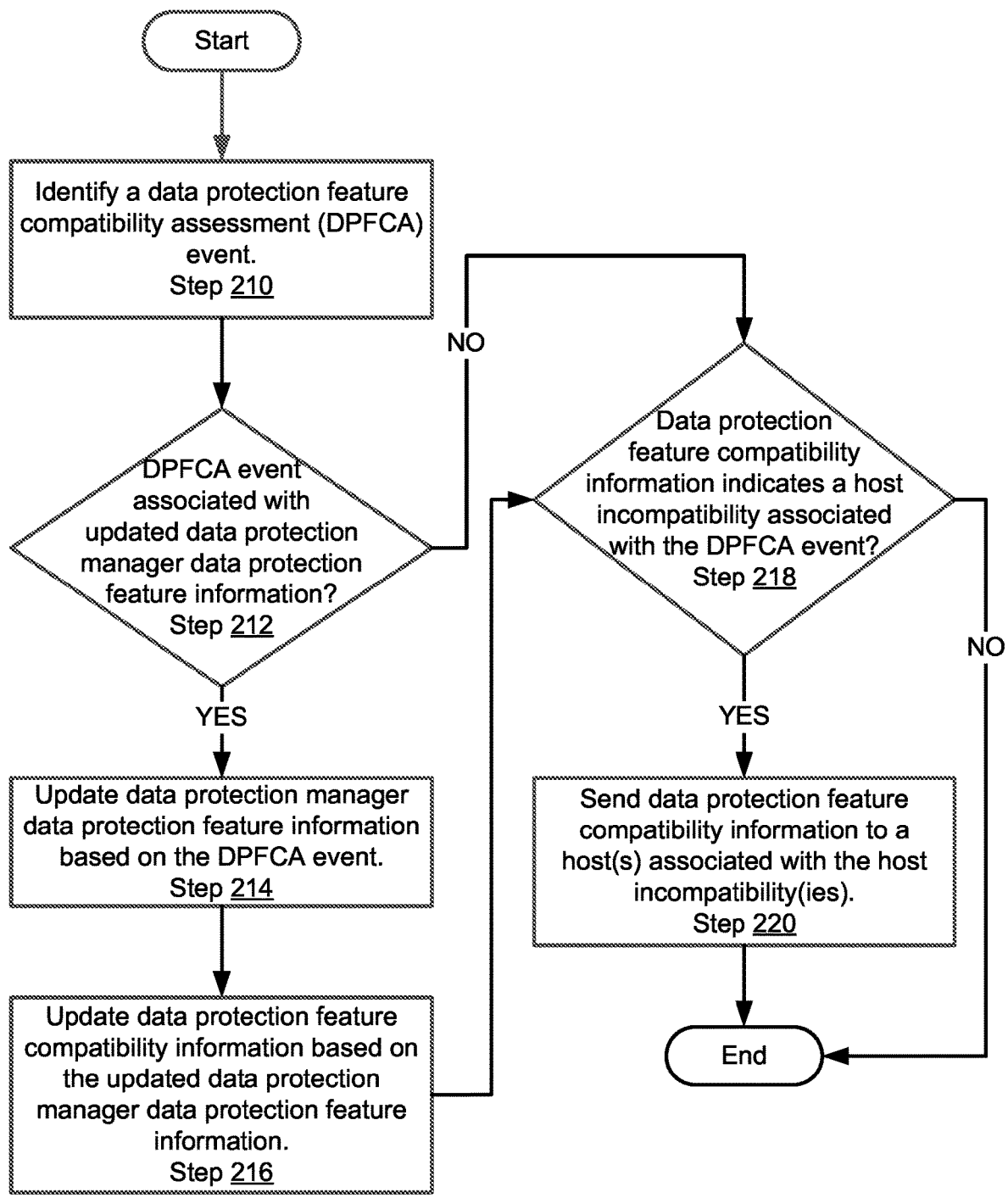
FIG. 2B shows a flowchart of a method for managing data protection feature compatibility in accordance with one or more embodiments of the invention.

FIG. 2B shows a flowchart of a method for managing data protection feature compatibility in accordance with one or more embodiments of the invention. The method may be performed by, for example, an upgrade manager (122, FIG. 1A) of a data manager (120, FIG. 1A). Other components of the system illustrated in FIG. 1A may perform all, or a portion, of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 210, a data protection feature compatibility assessment (DPFCA) event is identified.

In one or more embodiments of the invention, the data protection manager is upgraded. As discussed above, the data protection manager may be upgraded to a newer version. The upgraded data protection manage may include new, additional, and/or different data protection features compared to the previous version. The upgrade manager may identify the upgrade of the data protection manager as a DPFCA event. The DPFCA may be identified via other and/or additional methods without departing from the invention.

In one or more embodiments of the invention, a user of a host sends a message to the upgrade manager of the data protection manager. The message may include a request to determine the compatibility between the host and the data protection manager. The message may include the host identifier and/or the data protection agent identifier of the data protection agent of the host. The message may include other and/or additional information without departing from the invention. The message may be, for example, an API call. The upgrade manager may identify the receipt of the message as the DPFCA event. The DPFCA event may be identified via other and/or additional methods without departing from the invention.

In one or more embodiments of the invention, a user of a host may send a message to the upgrade manager of the data protection manager. The message may include a request to initiate the performance of a data protection feature. The message may include the data protection feature identifier, the host identifier, and/or the data protection agent identifier of the data protection agent of the host. The message may be, for example, an API call. The upgrade manager may identify the receipt of the message as the DPFCA event. The DPFCA event may be identified via other and/or additional methods without departing from the invention.

In step 212, a determination is made as to whether the DPFCA event is associated with updated data protection manager data protection feature information.

As discussed above in step 210, the DPFCA event may be the upgrade of the data protection manager, a request to identify data protection feature incompatibilities between a host and the data protection manager, and/or a request to initiate the performance of a data protection feature for a host. The upgrade manager of the data protection manager may check whether the DPFCA event is an upgrade of the data protection manager, and therefore, associated with updated data protection manager data protection feature information. If the DPFCA event is an upgrade of the data protection manager, then the upgrade manager may determine that the DPFCA event is associated with updated data protection manager data protection feature information. If the DPFCA event is not an upgrade of the data protection manager (i.e., it is a request to identify data protection feature incompatibilities between a host and the data protection manager, or a request to initiate the performance of a data protection feature for a host), then the upgrade manager may determine that the DPFCA event is not associated with updated data protection manager data protection feature information. The determination as to whether the DPFCA event is associated with updated data protection manager data protection feature information may be made via other and/or additional methods without departing from the invention.

In one or more embodiments of the invention, if it is determined that the DPFCA event is associated with updated data protection manager data protection feature information, then the method proceeds to step 214. In one or more embodiments of the invention, if it is determined that the DPFCA event is not associated with updated data protection manager data protection feature information, then the method proceeds to step 218.

In step 214, the data protection manager data protection feature information is updated based on the DPFCA event.

In one or more embodiments of the invention, the upgrade manager updates the data protection manager version identifier and the data protection manager data protection feature list based on the upgrade of the data protection manager. The upgrade of the data protection manager may specify the data protection manager version identifier and the data protection manager data protection features list associated with the data protection manager version of the upgraded data protection manager. The upgrade manager may replace the previous data protection manager version identifier and the previous data protection manager data protection feature list included in the data protection manager data protection feature information with the data protection manager version identifier and the data protection manager data protection feature list specified by the upgrade of the data protection manager. The data protection manager data protection feature information may be updated based on the DPFCA event via other and/or additional methods without departing from the invention.

In step 216, the data protection feature compatibility information is updated based on the updated data protection manager data protection feature information.

In one or more embodiments of the invention, the upgrade manager updates all entries included in the data protection feature compatibility information using the updated data protection manager data protection feature information. For each entry, the upgrade manager may compare the associated host data protection feature information with the updated data protection manager data protection feature information to identify all data protection features that are compatible and/or all data protection features that are incompatible between the data protection manager and the host associated with the entry. The upgrade manager may generate a list of compatible features and/or generate a list of incompatible features. The entry may specify whether (i) the host is fully compatible (i.e., host data protection features match all of data protection manager data protection features) with the data protection manager, (ii) partially compatible (i.e., host data protection features include some of the data protection manager data protection features) with the data protection manager, or (iii) incompatible (i.e., data protection manager data protection features not included in the host data protection features) with the data protection manager. The entry in the data protection feature compatibility information may include other and/or additional information without departing from the invention. The data protection feature compatibility information may be updated based on the updated data protection manager data protection feature information via other and/or additional methods without departing from the invention.

In step 218, a determination is made as to whether the data protection feature compatibility information indicates a host incompatibility associated with the DPFCA event.

In one or more embodiments of the invention, the upgrade manager checks the data protection feature compatibility information to determine whether the data protection feature compatibility information indicates a host incompatibility associated with the DPFCA event. If the DPFCA event is associated with a particular host (i.e., it is a request to identify data protection feature incompatibilities between a host and the data protection manager, or a request to initiate the performance of a data protection feature for a host), then the upgrade manager may only check data protection feature compatibility information entry associated with the host using the host identifier and/or data protection agent identifier associated with the host. If the data protection feature compatibility information entry specifies that the host is partially compatible or incompatible with the data protection manager, then the upgrade manager may determine that the data protection feature compatibility information indicates a host incompatibility associated with the DPFCA event. If the data protection feature compatibility information entry specifies that the host is fully compatible with the data protection manager, then the upgrade manager may determine that the data protection feature compatibility information does not indicate a host incompatibility associated with the DPFCA event.

If the DPFCA event is associated with an upgrade of the data protection manager, then the upgrade manager may check all entries included in the data protection compatibility information. If the data protection feature compatibility information entries specify that one or more hosts are partially compatible and/or incompatible with the data protection manager, then the upgrade manager may determine that the data protection feature compatibility information indicates a host incompatibility associated with the DPFCA event. If the data protection feature compatibility information entries specify that all hosts are fully compatible with the data protection manager, then the upgrade manager may determine that the data protection feature compatibility information does not indicate a host incompatibility associated with the DPFCA event. The determination as to whether the data protection feature compatibility information indicates a host incompatibility associated with the DPFCA event may be made via other and/or additional methods without departing from the invention.

In one or more embodiments of the invention, if it is determined that the data protection feature compatibility information indicates a host incompatibility associated with the DPFCA event, then the method proceeds to step 220. In one or more embodiments of the invention, if it is determined that the data protection feature compatibility information does not indicate a host incompatibility associated with the DPFCA event, then the method ends after step 218.

In step 220, the data protection feature compatibility information is sent to a host(s) associated with the host incompatibility (ies).

In one or more embodiments of the invention, the upgrade manager sends the data protection feature compatibility information entry associated with each host incompatibility to the hosts associated with the host incompatibilities. Accordingly, the data protection feature compatibility information may be available to users of the hosts. The data protection feature compatibility information may be displayed, by the data protection agents of the hosts, to users using a graphical user interface (GUI) and/or any other type of user interface without departing from the invention. The users may determine, based on the data protection feature compatibility information, whether to proceed with the current versions of the data protection agents executing on the hosts or to upgrade the data protection agents executing on the hosts. The data protection feature compatibility information associated with the host may be sent to the host(s) associated with the host incompatibility (ies) via other and/or additional methods without departing from the invention.

In one or more embodiments of the invention, for DPFCA events associated with a particular host (i.e., it is a request to identify data protection feature incompatibilities between a host and the data protection manager, or a request to initiate the performance of a data protection feature for a host), the upgrade manager sends an affirmation to the host if there is no host incompatibility associated with the host. The data protection feature compatibility information associated with the host may be sent to the host(s) associated with the host incompatibility (ies) via other and/or additional methods without departing from the invention.

In one or more embodiments of the invention, the method ends following step 220.

Figure 3A:
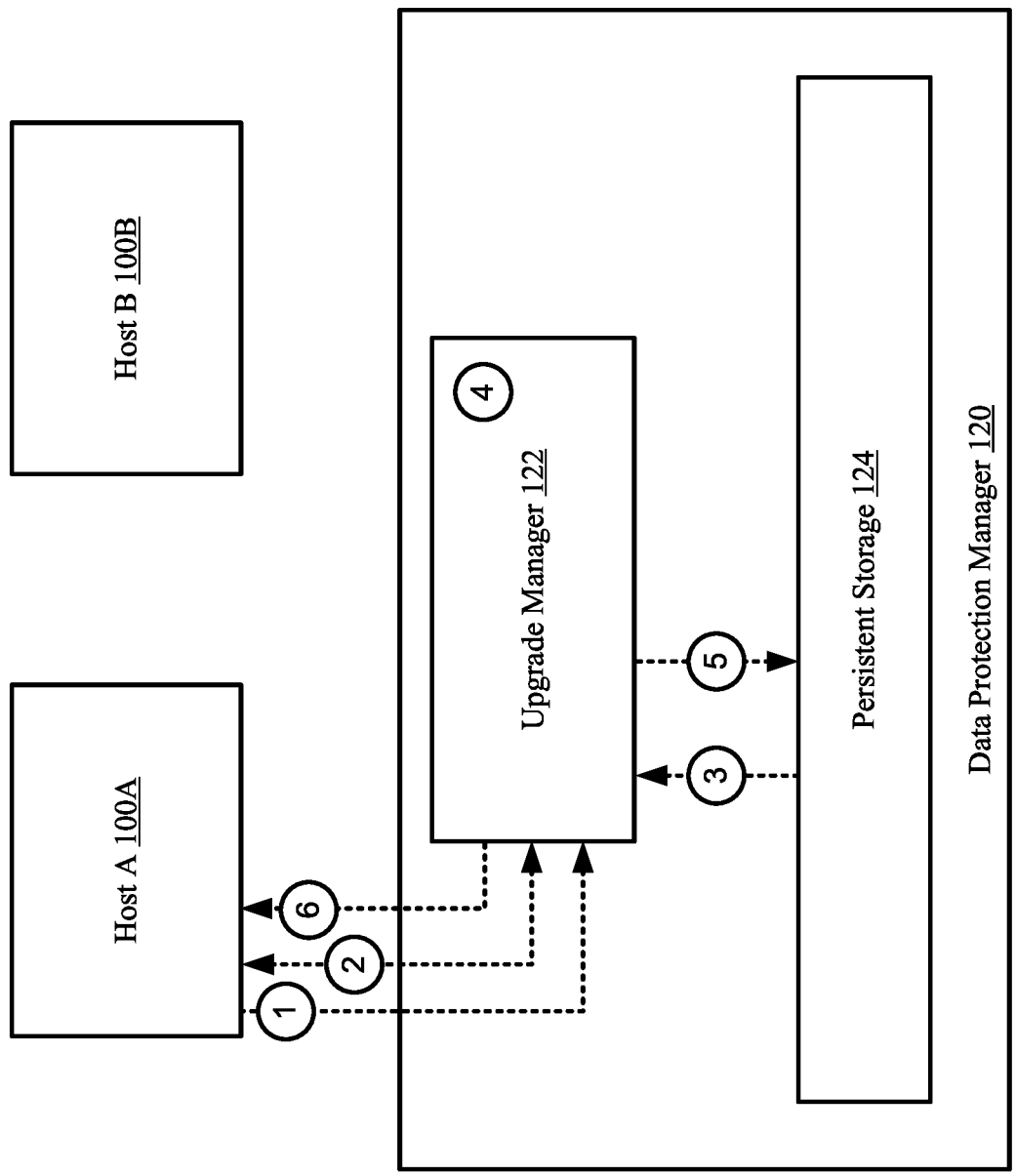
FIG. 3A shows a diagram of the operation of a first example system over time in accordance with one or more embodiments of the invention.
Figure 3B:
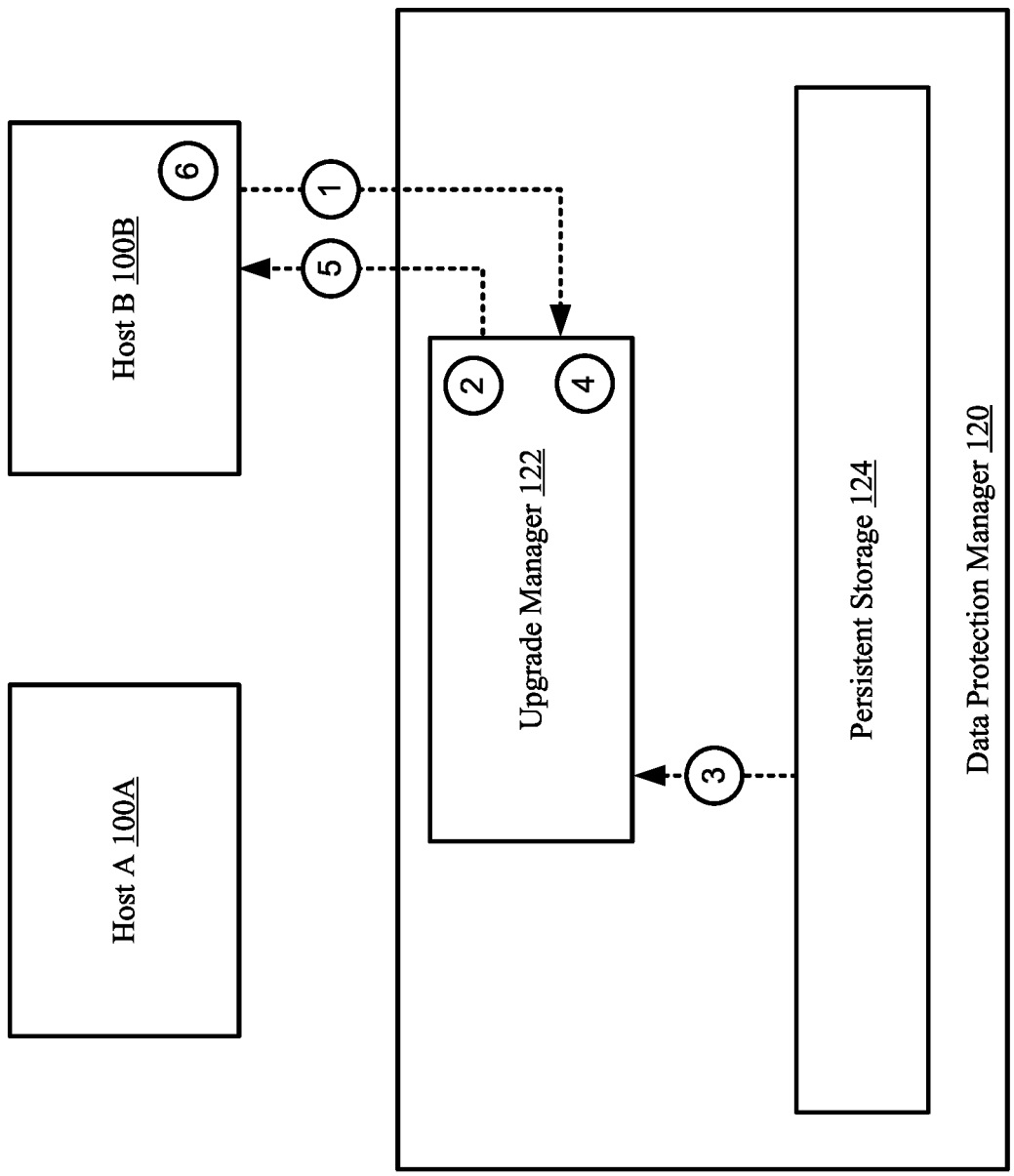
FIG. 3B shows a diagram of the operation of a second example system over time in accordance with one or more embodiments of the invention.

To further clarify embodiments of the invention, a non-limiting example is provided in FIGS. 3A-3B. FIGS. 3A-3B show diagrams of operations of an example system over time. FIGS. 3A-3B may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIGS. 3A-3B.

Example

FIG. 3A shows a diagram of the operation of a first example system over time in accordance with one or more embodiments of the invention. Turning to FIG. 3A, the example system includes two hosts, host A (100A) and host B (100B). The example system further includes a data protection manager (120). The data protection manager (120) includes an upgrade manager (122) and persistent storage (124). Consider a scenario in which host A (100A) registers with the data protection manager (120).

At step 1, host a sends a registration request to the upgrade manager (122) of the data protection manager (120). The upgrade manager (122) identifies obtaining the registration request as a host data protection feature information update event. In response to identifying the host data protection feature information update event, at step 2, the upgrade manager (122) sends a message to host A (100A). The message includes a request for host data protection feature information associated with host A (100A). In response to obtaining the message, host A (100A) sends the host data protection feature information to the upgrade manager (122). The host data protection feature information specifies that host A (100A) includes a data protection agent (not shown) associated with the most recent version. Additionally, the host data protection feature information specifies all the data protection features that the data protection agent of host A (100A) is capable of performing.

After obtaining the host data protection feature information, at step 3, the upgrade manager (122) obtains data protection manager data protection feature information from the persistent storage (124). The data protection manager data protection feature information specifies that the data protection manager (120) is associated with the newest version of data protection managers and includes a list of features the data protection manager (120) is capable of performing. The upgrade manager (122), at step 4, compares the data protection manager data protection feature information and the host data protection feature information and generates data protection feature compatibility information associated with host A (100A). The data protection feature compatibility information specifies that host A (100A) is fully compatible with the data protection manager (120). In other words, host A (100A) and the data protection manager (120) share the same features, where one does not include a feature that is not supported by the other.

At step 5, the upgrade manager (122) updates the host data protection feature information repository and the data protection feature compatibility information in the persistent storage (124) using the obtained host data protection feature information and the generated data protection feature compatibility information associated with host A (100A). At step 6, the upgrade manager (122) sends the data protection feature compatibility information associated with host A (100A) to host A (100A). As a result, host A (100A) may begin to obtain data protection services from the data protection manager (120).

FIG. 3B shows a diagram of the operation of a second example system over time in accordance with one or more embodiments of the invention. Turning to FIG. 3B, the example system includes two hosts, host A (100A) and host B (100B). The example system further includes a data protection manager (120). The data protection manager (120) includes an upgrade manager (122) and persistent storage (124). Consider a scenario in which a user of the system (e.g., a client, not shown) sends a request to the data protection manager to generate an on-demand backup of an application hosted by host B (100B).

At step 1, the user of host B (100B) sends a request to generate the on-demand backup of an application hosted by host B (100B). The upgrade manager (122) may identify the request as an data protection feature compatibility assessment (DPFCA) event. In response to identifying the DPFCA event, at step 2, the upgrade manager (122) makes a determination that the DPFCA event is not associated with updated data protection manager data protection feature information. In response to the determination, at step 3, the upgrade manager (122) obtains data protection feature compatibility information associated with host B (100B) from the persistent storage (124).

At step 4, the upgrade manager (122) makes a determination that the data protection feature compatibility information associated with host B (100B) indicates a host incompatibility. The data protection feature compatibility information specifies that, although the data protection manager (120) is capable of initiating and processing on-demand backups, the data protection agent associated with host B (100B) does not include that feature. The data protection agent is only capable of generating scheduled backups of the application. In response to the determination, at step 5, the upgrade manager (122) sends a message to host B (100B). The message indicates the on-demand backup request has been rejected as a result of a host B (100B) feature incompatibility. The message also includes the data protection feature compatibility information associated with host B (100). After obtaining the message, at step 6, a user of host B (100B) may initiate an upgrade of the data protection agent associated with host B (100B).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the efficiency of providing data protection services to hosts. More specifically, embodiments of the invention relate to managing data protection feature compatibility between a data protection manager and hosts. An upgrade manager of the data protection manager may automatically update data protection feature compatibility information that may specify host incompatibilities with the data protection manager when a host registers, upgrades the data protection agent associated with a host, and when the data protection manager is upgraded. The upgrade manager may use the data protection feature compatibility information to identify host incompatibilities with the data protection manager and to notify users of the host about the identified host incompatibilities. Accordingly, users may upgrade the data protection agents of the hosts to resolve host incompatibilities in an efficient manner.

In traditional systems, the users of hosts must identify host incompatibilities with the data protection manager, which may be error prone and inefficient for large systems. Embodiments of the invention improve the efficiency of managing data protection feature compatibility between hosts and a data protection manager as discussed above. As a result, the efficiency of performing data protection services may be improved by proactively identifying host incompatibilities with the data protection manager and notifying users of the hosts. Therefore, host incompatibilities may be promptly resolved and errors in the performance of data protection services due to host incompatibilities may be mitigated.

Thus, embodiments of the invention may address the problem of inefficient use of computing resources to manage data protection feature compatibility in a system. This problem arises due to the technological nature of the environment in which the system operates.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data protection feature compatibility, the method comprising:
identifying a host data protection feature update event associated with a host;
in response to identifying the host data protection feature update event:
obtaining host data protection feature information from the host;
updating a host data protection feature information repository using the host data protection feature information;
updating data protection feature compatibility information using the host data protection feature information and data protection manager data protection feature information; and
sending updated data protection feature compatibility information associated with the host to the host.

2. The method of claim 1, wherein the host data protection feature update event comprises one selected from a group consisting of:
a registration of the host, and
an update of the host.

3. The method of claim 1, wherein the host data protection feature information specifies data protection features that the host expresses a capability to perform.

4. The method of claim 1, the method further comprising:
after sending the updated data protection feature compatibility information associated with the host to the host:
identifying a data protection feature compatibility assessment event;
in response to identifying the data protection feature compatibility assessment event:
making a first determination that the data protection feature compatibility assessment event is associated with updated data protection manager data protection feature information; and
in response to the first determination:
updating the data protection manager data protection feature information based on the data protection feature compatibility assessment event;
updating the data protection feature compatibility information based on updated data protection manager data protection feature information;
making a second determination that the data protection feature compatibility information indicates a host incompatibility associated with the host; and
in response to the second determination:
sending data protection feature compatibility information associated with the host to the host.

5. The method of claim 4, wherein the data protection feature compatibility assessment event comprises one selected from a group consisting of:
an update to a data protection manager, and
a data protection service request.

6. The method of claim 4, wherein the data protection manager data protection feature information specifies data protection features that a data protection manager expresses a capability to perform.

7. The method of claim 4, wherein the data protection feature compatibility information specifies whether data protection features of the data protection manager are compatible with the data protection features of the host.

8. A non-transitory computer readable medium comprising computer readable program code, which when executed by a computer processor enables the computer processor to perform a method for managing data protection feature compatibility, the method comprising:
    identifying a host data protection feature update event associated with a host;
    in response to identifying the host data protection feature update event:
        obtaining host data protection feature information from the host;
        updating a host data protection feature information repository using the host data protection feature information;
        updating data protection feature compatibility information using the host data protection feature information and data protection manager data protection feature information; and
        sending updated data protection feature compatibility information associated with the host to the host.

9. The non-transitory computer readable medium of claim 8, wherein the host data protection feature update event comprises one selected from a group consisting of:
    a registration of the host, and
    an update of the host.

10. The non-transitory computer readable medium of claim 8, wherein the host data protection feature information specifies data protection features that the host expresses a capability to perform.

11. The non-transitory computer readable medium of claim 8, wherein the method further comprises:
    after sending the updated data protection feature compatibility information associated with the host to the host:
        identifying a data protection feature compatibility assessment event;
        in response to identifying the data protection feature compatibility assessment event:
            making a first determination that the data protection feature compatibility assessment event is associated with updated data protection manager data protection feature information; and
            in response to the first determination:
                updating the data protection manager data protection feature information based on the data protection feature compatibility assessment event;
                updating the data protection feature compatibility information based on updated data protection manager data protection feature information;
                making a second determination that the data protection feature compatibility information indicates a host incompatibility associated with the host; and
                in response to the second determination:
                    sending data protection feature compatibility information associated with the host to the host.

12. The non-transitory computer readable medium of claim 11, wherein the data protection feature compatibility assessment event comprises one selected from a group consisting of:
    an update to a data protection manager, and
    a data protection service request.

13. The non-transitory computer readable medium of claim 11, wherein the data protection manager data protection feature information specifies data protection features that a data protection manager expresses a capability to perform.

14. The non-transitory computer readable medium of claim 11, wherein the data protection feature compatibility information specifies whether data protection features of the data protection manager are compatible with the data protection features of the host.

15. A system for managing data protection feature compatibility, the system comprising:
    persistent storage for storing data protection feature compatibility information;
    a data protection manager, comprising a processor and memory, configured to:
        identify a host data protection feature update event associated with a host;
        in response to identifying the host data protection feature update event:
            obtain host data protection feature information from the host;
            update a host data protection feature information repository using the host data protection feature information;
            update the data protection feature compatibility information using the host data protection feature information and data protection manager data protection feature information; and
            send updated data protection feature compatibility information associated with the host to the host.

16. The system of claim 15, wherein the host data protection feature update event comprises one selected from a group consisting of:
    a registration of the host, and
    an update of the host.

17. The system of claim 15, wherein the host data protection feature information specifies data protection features that the host expresses a capability to perform.

18. The system of claim 15, wherein the data protection manager is further configured to:
    after updated sending the data protection feature compatibility information associated with the host to the host:
        identify a data protection feature compatibility assessment event;
        in response to identifying the data protection feature compatibility assessment event:
            make a first determination that the data protection feature compatibility assessment event is associated with updated data protection manager data protection feature information; and
            in response to the first determination:
                update the data protection manager data protection feature information based on the data protection feature compatibility assessment event;
                update the data protection feature compatibility information based on updated data protection manager data protection feature information;
                make a second determination that the data protection feature compatibility information indicates a host incompatibility associated with the host; and
                in response to the second determination:
                    send data protection feature compatibility information associated with the host to the host.

19. The system of claim 18, wherein the data protection feature compatibility assessment event comprises one selected from a group consisting of:
   an update to the data protection manager, and
   a data protection service request.

20. The system of claim 18, wherein the data protection manager data protection feature information specifies data protection features that a data protection manager expresses a capability to perform.

* * * * *